(12) United States Patent
Wen et al.

(10) Patent No.: US 7,835,058 B2
(45) Date of Patent: Nov. 16, 2010

(54) BROAD SPECTRAL RANGE POLARIZATION ROTATOR

(75) Inventors: Bing Wen, Camarillo, CA (US); Milind P. Mahajan, Thousand Oaks, CA (US); Bruce K Winker, Ventura, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 1 day.

(21) Appl. No.: 12/402,344

(22) Filed: Mar. 11, 2009

(65) Prior Publication Data
US 2009/0168137 A1   Jul. 2, 2009

Related U.S. Application Data

(62) Division of application No. 11/238,307, filed on Sep. 29, 2005, now Pat. No. 7,525,712.

(51) Int. Cl.
   *G02F 1/03* (2006.01)
(52) U.S. Cl. ........................................ 359/252
(58) Field of Classification Search ................ 359/498, 359/494, 497, 337, 577, 578, 900; 349/102, 349/104
   See application file for complete search history.

(56) References Cited

U.S. PATENT DOCUMENTS

| | | | | |
|---|---|---|---|---|
| 5,347,378 A | * | 9/1994 | Handschy et al. | 349/78 |
| 6,426,816 B1 | * | 7/2002 | Wu et al. | 398/65 |
| 6,437,904 B1 | * | 8/2002 | Reeder | 359/322 |
| 6,735,016 B1 | * | 5/2004 | Mao et al. | 359/484 |
| 7,057,737 B2 | * | 6/2006 | Millerd et al. | 356/495 |
| 7,058,252 B2 | * | 6/2006 | Woodgate et al. | 385/16 |
| 7,079,320 B2 | * | 7/2006 | Kewitsch | 359/618 |
| 7,085,052 B2 | * | 8/2006 | Patel et al. | 359/497 |

* cited by examiner

*Primary Examiner*—Scott J Sugarman
*Assistant Examiner*—Tuyen Q Tra
(74) *Attorney, Agent, or Firm*—Glenn H. Lenzen; Polsinelli Shughart PC

(57) ABSTRACT

A switchable apochromatic polarization rotator is provided. A first fixed waveplate has a first principal axis fixed in a first orientation. A second fixed waveplate has a second principal axis fixed in a second orientation. First and second switchable waveplates have principal axes oriented such that broad spectral range electromagnetic radiation transmitted through all of the waveplates has a first rotated polarization, wherein, in response to one or more control signals applied to the switchable waveplates, the principal axes of the switchable waveplates rotate such that the electromagnetic radiation transmitted through all of the waveplates has a second rotated polarization. The switchable waveplates utilize ferroelectric liquid crystal material, nematic liquid crystal material, or be mechanically rotated to adjust for orientation of their principal axes. Utilizing waveplates as described may be used to tune for a desired spectral range and/or compensate for temperature dependencies.

14 Claims, 7 Drawing Sheets

BROAD SPECTRAL RANGE POLARIZATION ROTATOR

RELATED APPLICATIONS

This is a divisional application which claims the benefit of U.S. patent application Ser. No. 11/238,307 filed Sep. 29, 2005 now U.S. Pat. No. 7,525,712, the entire contents of which are incorporated herein by reference.

BACKGROUND

The prior art is familiar with polarization rotators, which are for example useful in image enhancement, polarimetry and optical switching. The polarization rotator receives a beam of optical radiation with a first polarization state and produces a new coaxial beam with a second polarization state. One prior art polarization rotator employs an electrically-switchable half-wave plate that, when switched, converts the incoming beam at a first polarization state into an orthogonal state, for example rotating linearly polarized light by ninety degrees. Another prior art polarization rotator operates similarly but employs twisted nematic liquid crystal in an electrically-switched cell.

Figure 1:
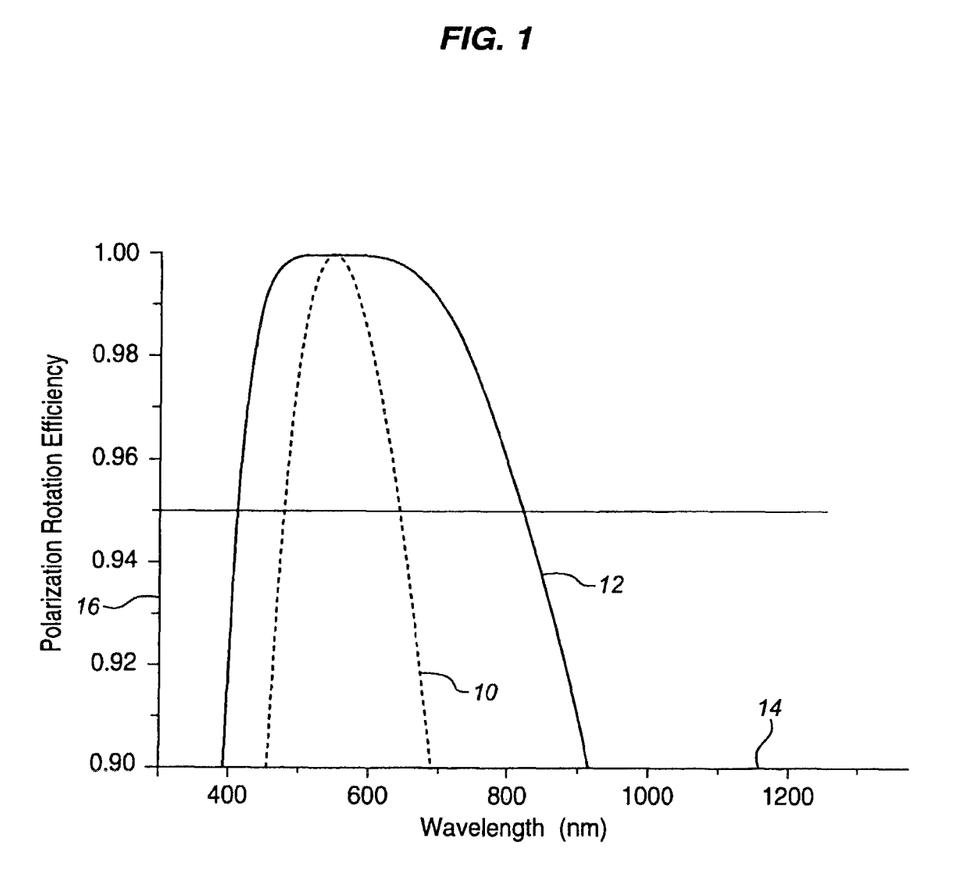
FIG. 1 graphically depicts spectral range of prior art polarization rotators employing half-wave plates.

But prior art polarization rotators do not simultaneously provide sufficient switching speed over a broad spectral range. For example, prior art polarization rotators employing thick twisted nematic liquid crystals operate over a broad spectral range but have switching speeds limited to seconds. On the other hand, prior art polarization rotators employing a half-wave plate have switching speeds faster than 100 μs but have very limited spectral range. FIG. 1 illustrates the spectral range 10 of a prior art polarization rotator employing one half-wave plate for ?=550 nm, and the spectral range 12 of a prior art polarization rotator employing three half-wave plates for X=550 nm. In FIG. 1, x-axis 14 represents wavelength and y-axis 16 represents percentage of 90 degree rotation of the polarization state.

SUMMARY

In one embodiment, a switchable apochromatic polarization rotator is provided. A first fixed waveplate has a first principal axis fixed in a first orientation. A second fixed waveplate has a second principal axis fixed in a second orientation. First and second switchable waveplates have principal axes oriented such that electromagnetic radiation transmitted through all of the waveplates has a first rotated polarization, wherein, in response to one or more control signals applied to the switchable waveplates, the principal axes of the switchable waveplates rotate such that the electromagnetic radiation transmitted through all of the waveplates has a second rotated polarization.

In one embodiment, a method rotates polarizations of broad spectral range electromagnetic radiation through optics, including: positioning two switchable waveplates and two fixed waveplates such that the electromagnetic radiation transmitted through all of the waveplates has a first rotated polarization; and applying one or more control signals to the switchable waveplates such that the electromagnetic radiation transmitted through all of the waveplates has a second rotated polarization.

In one embodiment, a polarization rotator has two switchable waveplates and two fixed waveplates configured such that broad spectral range electromagnetic radiation transmitted through all of the waveplates has a first rotated polarization. The two switchable waveplates are responsive to one or more applied control signals such that the electromagnetic radiation transmitted through all of the waveplates has a second rotated polarization.

In one embodiment, a tunable polarization rotator has four switchable waveplates configured such that broad spectral range electromagnetic radiation transmitted through all of the waveplates has a first rotated polarization. The switchable waveplates change retardation in response to one or more applied control signals such that the electromagnetic radiation transmitted through all of the waveplates has a second rotated polarization.

In one embodiment, a method tunes the spectral range of polarization rotation of electromagnetic radiation through optics by changing control signals on four switchable waveplates. The method may include positioning four switchable waveplates, followed by a polarizer, such that a first spectral range of electromagnetic radiation is transmitted through all of the waveplates and the polarizer; and then applying the control signals to the switchable waveplates such that a second spectral range of the electromagnetic radiation is transmitted through all of the waveplates and the polarizer.

DETAILED DESCRIPTION OF THE FIGURES

Figure 2:
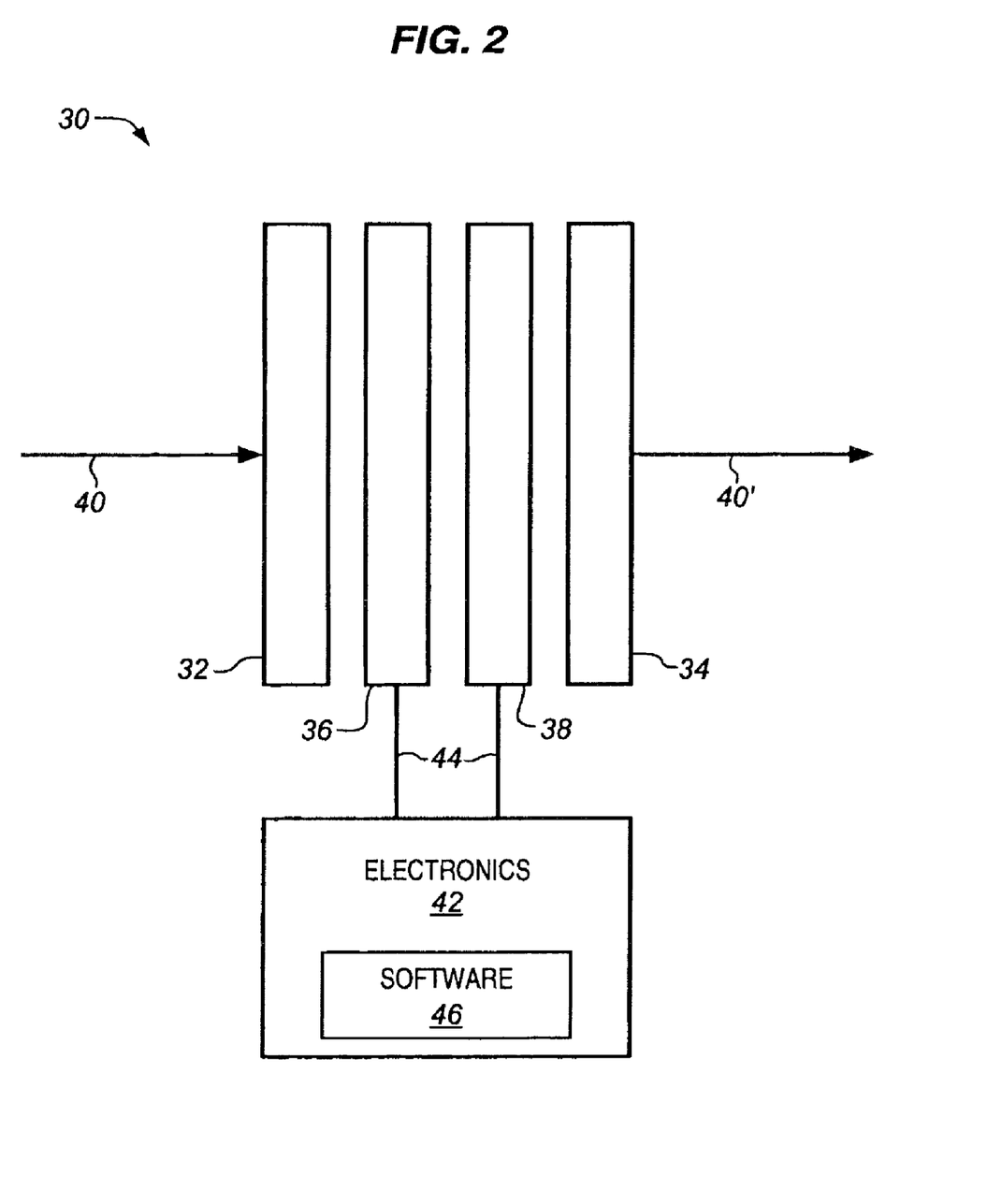
FIG. 2 shows one broad spectral range polarization rotator.

FIG. 2 shows one broad spectral range polarization rotator 30. Rotator 30 has a first fixed waveplate 32, a second fixed waveplate 34, a first switchable waveplate 36 and a second switchable waveplate 38. Broad spectral range electromagnetic radiation 40 incident upon rotator 30 transmits through rotator 30 as output radiation 40'. Radiation 40' has a polarization state that is rotated from the polarization state of incident radiation 40.

The term apochromatic is useful in characterizing polarization rotator 30 since it is capable of rotating polarization of input radiation 40 with an acceptable polarization rotation efficiency across a broad spectral range. Polarization rotation efficiency may be illustratively defined as a fraction p, such that when polarization rotator 30 is placed between crossed-polarizers, the fraction of input radiation that passes through the polarization rotator (a) at a first state is greater than p and (b) at a second state is less than 1−p. A polarization rotation efficiency p equal or greater than 0.95 (ignoring polarization independent losses) is required for most applications. We characterize spectral range by wavelength ratio, i.e., the ratio of longest and shortest wavelength. For the purpose of this disclosure, a broad spectral range may be defined as a spectral range where the wavelength ratio is approximately 2.1 or greater. Increasing the incidence angle has the effect of increasing the effective retardation of all the waveplates, which shifts the center wavelength of the spectral range of the polarization rotation. Therefore broad spectral range at one incidence angle can be considered equivalent to broad incidence angle range at one wavelength. Thus rotator 30 may be advantageous in situations where incidence angle range is required, for example, to accommodate a large field of view or a low f-number optical system.

Each waveplate is characterized by its principal axes and retardation. It is usually made of birefringent materials, including biaxial materials. Each fixed waveplate 32, 34 is for example a half-wave plate (λ/2 plate) with a retardation of approximately one-hundred and eighty degrees for a specific wavelength λ. This specific wavelength λ is within the broad spectral range transmitted through polarization rotator 30; the actual value of λ is determined by specific application of rotator 30. In the examples and figures that follow, the half-wave plates are for ?=550 nm.

Figure 6:
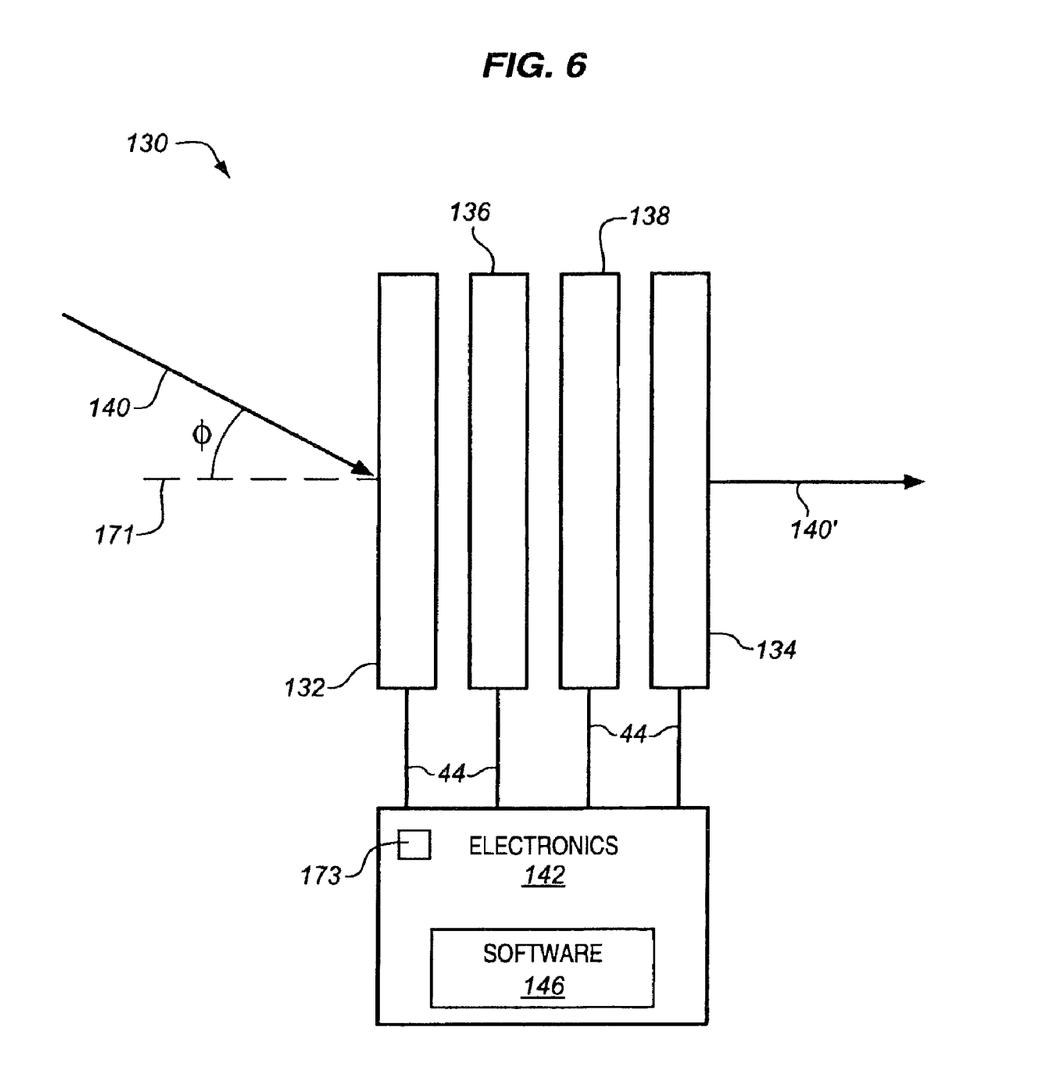
FIG. 6 shows one apochromatic polarization rotator.
Figure 7:
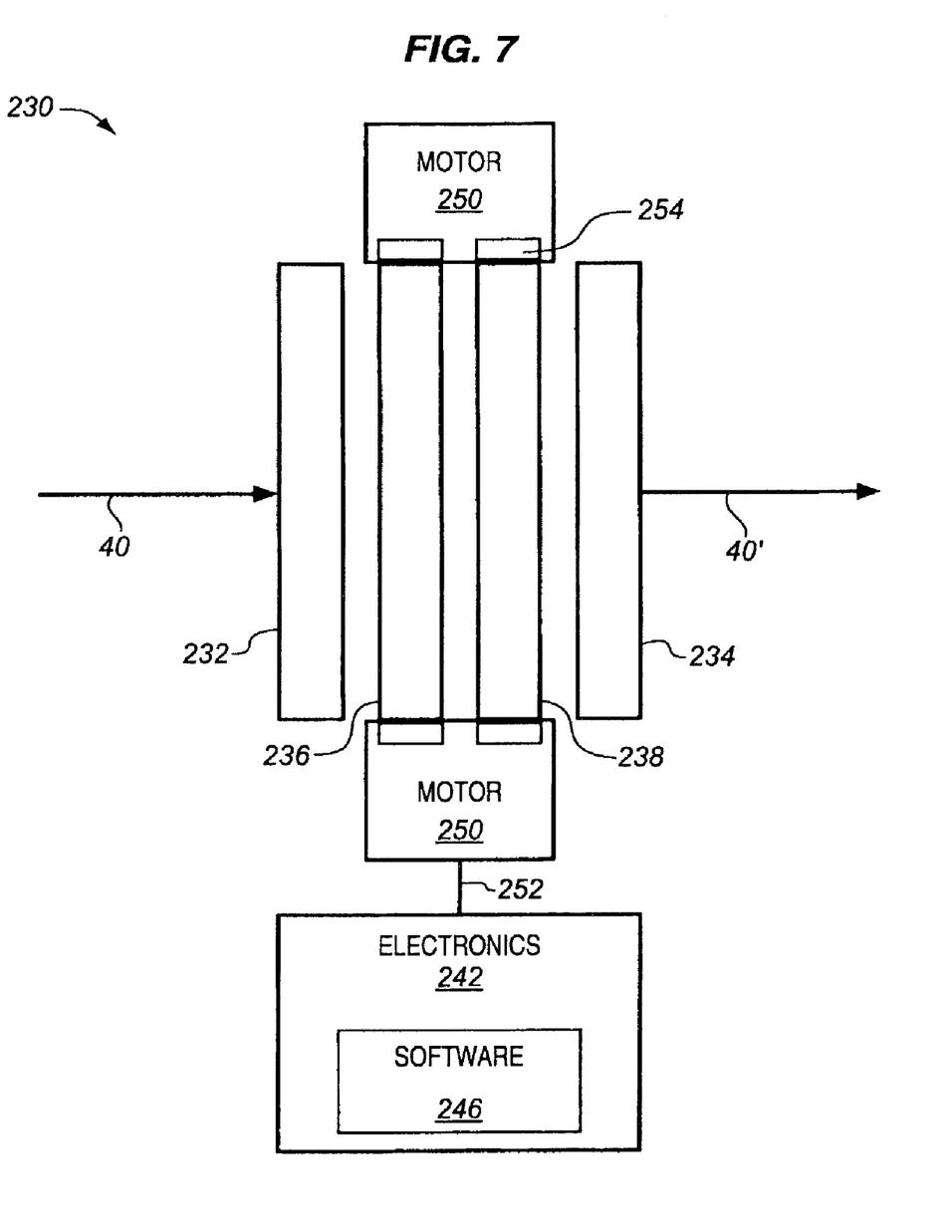
FIG. 7 shows one apochromatic polarization rotator.

A "switchable waveplate" means that its principal axis is changeable. either by applying voltage to the waveplate (e.g., to change its retardation or to reorient the principal axis) as shown in FIG. 2 and FIG. 6, or by physically rotating the waveplate, as in FIG. 7. One exemplary switchable waveplate is thus a half-wave plated made from a film of liquid crystal material, which provides both low loss and thin packaging. Other embodiments of switchable waveplates are described hereinbelow.

More particularly, the principal axes of first and second fixed waveplates 32, 34 is fixed in orientation. The principal axes of first and second switchable waveplates 36, 38 depend upon control signals (e.g., voltage or current) applied to first and second switchable waveplates 36, 38. In an embodiment, switchable waveplates 36, 38 employ ferroelectric liquid crystal material such that the principal axes rotate in response to the applied control signals.

In an embodiment, electronics 42 coupled to first and second switchable waveplates 36, 38 provides the applied control signals via signal lines 44, such as shown. First and second switchable waveplates 36, 38 may be arranged within rotator 30 such that, with a first control signal (control signal 1), broad spectral range electromagnetic radiation 40' as transmitted through all of the waveplates 32, 34, 36, 38 has a first rotated polarization; and with a second control signal (optionally no voltage), broad spectral range electromagnetic radiation 40' as transmitted through all of the waveplates has a second rotated polarization. Thus the principal axes of waveplates 32, 34, 36, 38 may for example be configured according to the following Table 1.

TABLE 1

Example Orientations of Principal Axes

| | Fixed l/2k Plate 32 | Switchable 1/2X Plate 36 | Switchable l/2k Plate 38 | Fixed 1/2X Plate 34 |
|---|---|---|---|---|
| control | 7.5° | 29.5° | 60.5° | 82.5° |
| control | 7.5° | 97.5° | −7.5° | 82.5° |

The angles listed in Table 1 are approximate and may be changed by about +/−6 degrees while keeping polarization rotation efficiency above 0.95.

The angles listed in Table 1 and discussed hereafter are referenced with respect to the polarization direction of the incoming light, or to the direction perpendicular to it. Furthermore, a positive angle can correspond to either a clockwise or counter clockwise direction. Permutations of such angles may generate devices that function in the same manner. Examples shown herein are for ninety degree rotation of the polarization; though smaller rotation angles, can be achieved by altering the listed angles. For example, to achieve 45 degrees rotation, the angles corresponding to control signal 1 are (3.75°, 14.75°, 30.25°, 41.25°), the angles corresponding to control signal 2 (no rotation) are (3.75°, 93.75°, −47.75°, 41.25°).

More generally, first and second switchable waveplates 36, 38 may be arranged within rotator 30 such that, with a first control signal (control signal 1) on signal lines 44, broad spectral range electromagnetic radiation 40' as transmitted through all of the waveplates 32, 34, 36, 38 has a first rotated polarization; and with a second control signal (control signal 2) on signal lines 44, broad spectral range electromagnetic radiation 40' as transmitted through all of the waveplates has a second rotated polarization. The principal axes of waveplates 32, 34, 36, 38 may thus be configured as in alternate configurations set forth in Table 2, for example, where S represents a switchable waveplate (36, 38, each the same or substantially similar) and where F represents a fixed waveplate (32, 34, each substantially similar).

TABLE 2

Waveplate Sequences and Principal Axes Orientations

| | F | S | S | F |
|---|---|---|---|---|
| control signal 1 | 7.5° | 29.5° | 60.5° | 82.5° |
| control signal 2 | 7.5° | 97.5° | −7.5 | 82.5 |

| | S | F | S | F |
|---|---|---|---|---|
| control signal 1 | 7.5° | 29.5° | 60.5° | 82.5° |
| control signal 2 | −60.5° | 29.5° | −7.5° | 82.5° |

| | S | F | F | S |
|---|---|---|---|---|
| control signal 1 | 7.5° | 29.5° | 60.5° | 82.5° |
| control signal 2 | −60.5° | 29.5° | 60.5° | −29.5° |

| | F | S | F | S |
|---|---|---|---|---|
| control signal 1 | 7.5° | 29.5° | 60.5° | 82.5° |
| control signal 2 | 7.5° | 97.5° | 60.5° | −29.5° |

It should be apparent that the waveplates may be configured such that one of control signals 1 or 2 in effect has no signal (e.g., zero applied voltage).

Figure 3:
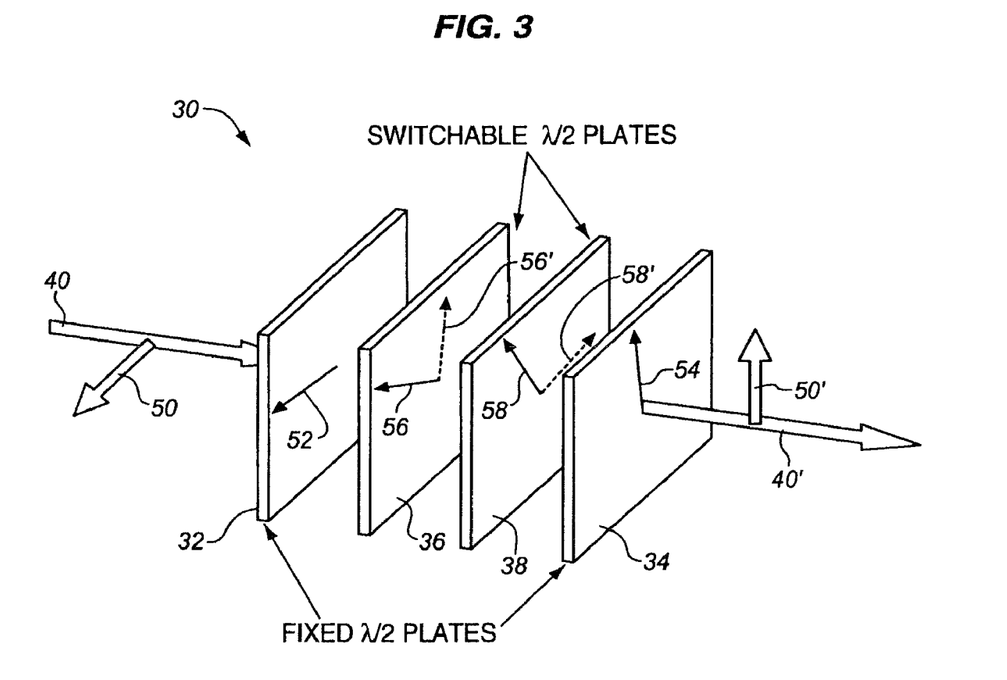
FIG. 3 shows a perspective, operational view of the polarization rotator of FIG. 2.

FIG. 3 shows a perspective, operational view of polarization rotator 30 configured as in Table 1. Incident electromagnetic radiation 40 is shown with a first polarization state 50; output radiation 40' is shown with a second polarization state 50' that is rotated from polarization state 50. First fixed waveplate 32 has its principal axis oriented to axis 52; first switchable waveplate 36 has its principal axis oriented to axis 56 (with control signal 1); second switchable waveplate 38 has its principal axis oriented to axis 58 (with control signal 1); and second fixed waveplate 34 has its principal axis oriented to axis 54, as shown. When control signal 2 is applied to switchable waveplates 36, 38, axes 56, 58 rotate (shown illustratively as axes 56' and 58') and the polarization state of output radiation 40' is the same as polarization state 50 of incident radiation 40. That is, when control signal 2 is applied, in this example, polarization state of radiation 40 is unrotated.

For example, polarization rotator 30 may be configured as in FIG. 3 except that polarization rotation occurs without applied voltage (e.g., as control signal 1). When voltage is applied (e.g., as control signal 2) to switchable waveplates 36, 38, the polarization state of output radiation 40' is the same as incident radiation 40 (i.e., polarization state 50).

Figure 4:
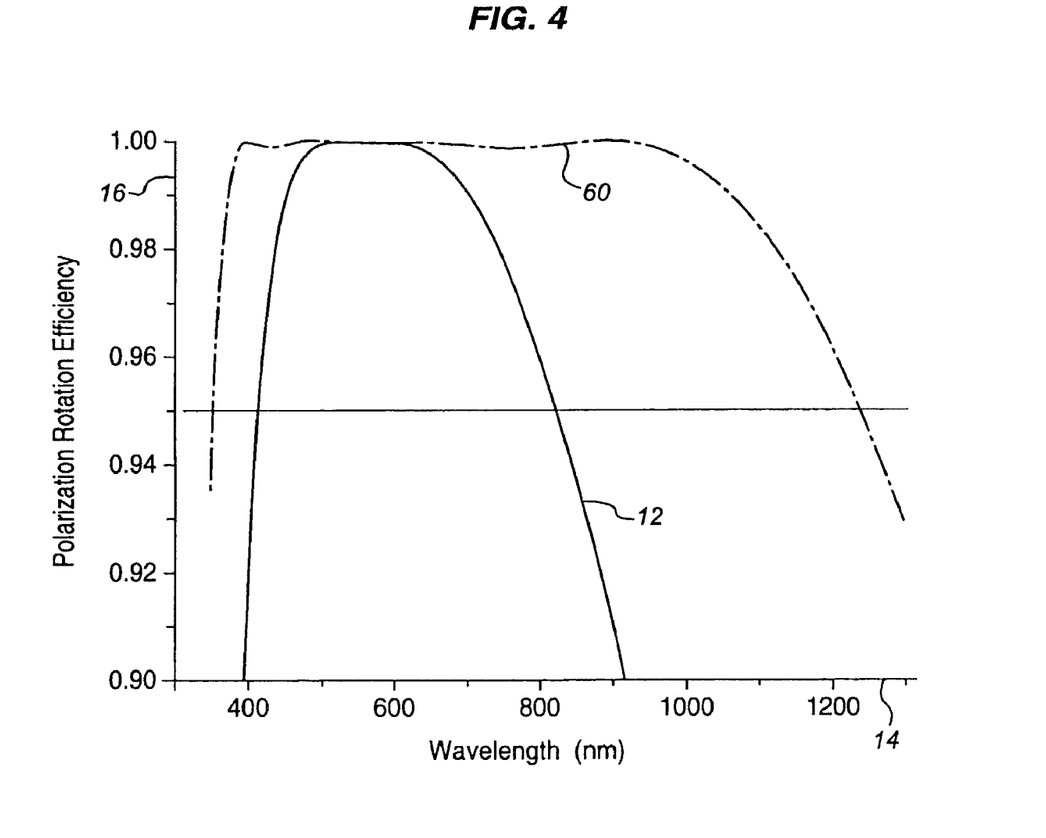
FIG. 4 illustrates spectral range of the polarization rotator of FIG. 2.

FIG. 4 graphically depicts spectral range 60 of polarization rotator 30. Spectral range 12 of a prior art polarization rotator employing three waveplates is also shown, to illustrate the increased spectral bandpass provided by rotator 30. As in FIG. 1, x-axis 14 represents wavelength and y-axis 16 represents percentage of 90 degree rotation of the polarization state. The illustrated embodiment operates over a wavelength ratio of 3.5, i.e., the ratio of longest wavelength to shortest wavelength over which p>0.95. The prior art operates over a wavelength ratio of only 2.1.

In FIG. 3, switchable waveplates 36, 38 are shown positioned between first and second fixed waveplates 32, 34; however this is not a requirement. For example, assuming the switchable waveplates are identical and the fixed waveplates are identical, any of the following four arrangements may be used: SFSF, FSFS FSSF or SFFS, where again S represents a switchable waveplate (36, 38) and where F represents a fixed waveplate (32, 34).

Figure 5:
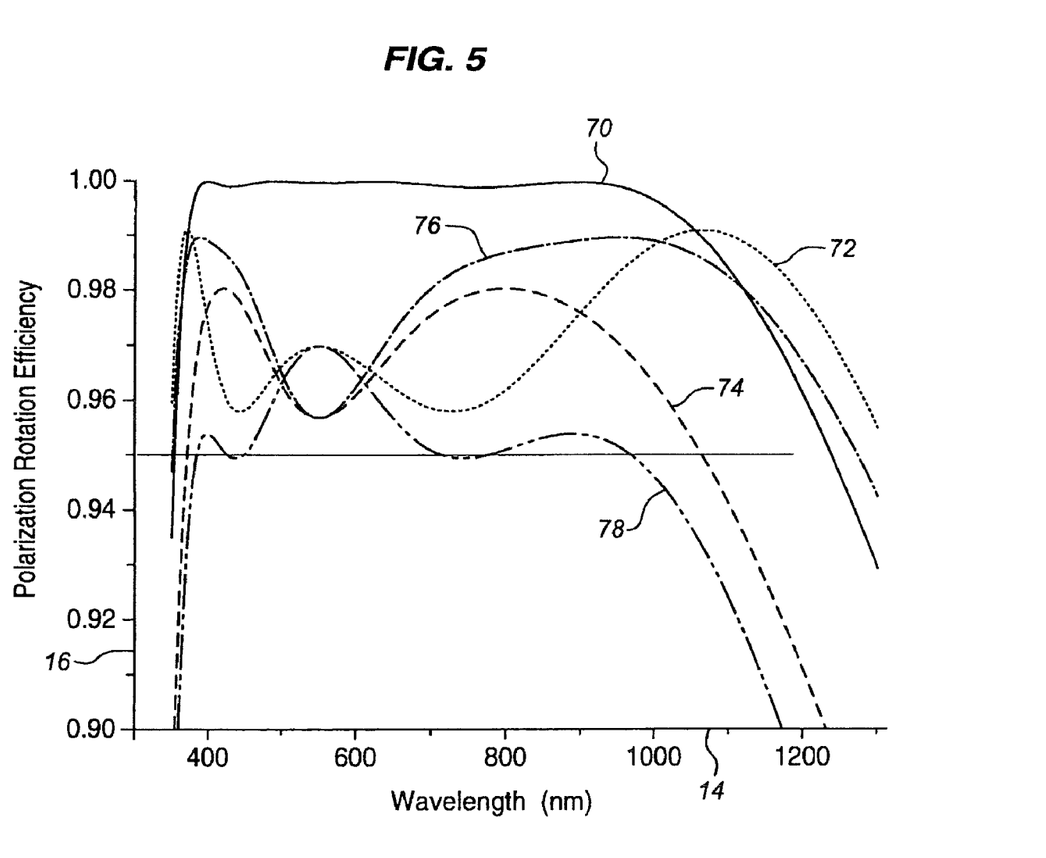
FIG. 5 illustrates polarization rotation efficiency with alignment and/or manufacturing tolerance errors.

In addition, the angular specifications set forth in Table 1 need not be exactly implemented within rotator 30 to function appropriately. The angle between adjacent elements of rotator 30 may have a tolerance of +/- one degree, for example, and the resulting rotator 30 will still operate with polarization rotation efficiency larger than 0.99, thus providing for certain manufacturing tolerance and/or misalignment during assembly. FIG. 5 illustrates polarization rotation efficiency with variations in principal axes caused by such misalignment or tolerance: curve 70 represents Table 2 specification of (7.5°, 29.5°, 60.5°, 82.5°); curve 72 represents an incremental increase by 6° (7.5°, 35.5°, 60.5° 82.5°); curve 74 represents an incremental decrease by 5° (7.5°, 24.5°, 60.5°, 82.5°); curve 76 represents an incremental decrease by 4° (7.5°, 28.5°, 60.5° 78.5°); and curve 78 represents an incremental increase by 7° (7.5°, 28.5°, 60.5°, 89.5°). The polarization rotation efficiency from 400 nm to 1200 nm is still above 0.95 even with the variances.

Referring again to FIG. 2, electronics 42 may operate automatically according to programming instructions of software 46, for example. Accordingly, a computer under control of a microprocessor may function as electronics 42 and software 46; a user may thus operate the computer to selectively rotate polarization rotation of rotator 30, for example. Moreover, since signals on signal lines 44 may be identical, and since each switchable waveplate 36, 38 may be switched simultaneously, polarization rotator 30 may be controlled by a single, low voltage channel. This switching can thus occur quickly, for example at 1001 as when the switchable waveplate utilizes ferroelectric liquid crystal. Rotator 30 may thus provide both broad spectral range and fast switching capability.

Polarization rotator 30 may therefore benefit certain applications, particularly with its improved speed and spectral range as compared to the prior art. For example, when followed by a polarizer, rotator 30 can act as a switchable polarization filter. In another example, rotator 30 may be beneficially used in polarization imaging applications, in which two consecutive images are taken of the same subject, each of different polarization states. These two images are further processed to determine specific polarization signatures of the subject. Accordingly the fast switching speed achieved by polarization rotator 30 is especially useful in capturing such polarization signatures, since images may be taken one after another without misregistration between the images due to motion. In still another example, with a non-absorbing polarizer coupled with the rotator, the rotator may function as a broad band beam steering device.

FIG. 6 shows one apochromatic polarization rotator 130; rotator 130 may again be configured to operate across a broad spectral range such as described in FIG. 1. Rotator 130 has a first switchable waveplate 132, a second switchable waveplate 134, a third switchable waveplate 136 and a fourth switchable waveplate 138. Broad spectral range electromagnetic radiation 140 incident upon rotator 30 transmits through rotator 130 as output radiation 140'. Radiation 140' has a polarization state that is rotated from the polarization state of incident radiation 140.

Rotator 130 may thus operate similarly to rotator 30, FIG. 2, except that it is operated by changing retardation of the switchable waveplates. Rotator 130 may for example employ four nematic switchable waveplates, with their principal axes oriented along the angles of 7.5°, 29.5°, 60.5° and 82.5°. Electronics 142 coupled to first, second, third and fourth switchable waveplates 132, 134, 136, 138 provides (e.g., under control of software 146) applied control signals via signal lines 144, such as shown. Under one control signal (e.g., voltage V1 on each signal line 144), the switchable waveplates are arranged for example such that transmission of electromagnetic energy 140 through rotator 130 is rotated by 90 degrees. On another applied control signal (e.g., voltage V2 on each signal line 144), all waveplates 132, 134, 136, 138 are switched to a state where retardation is zero; in this state, electromagnetic radiation 140 transmits straight through rotator 130 without rotation. Switching of rotator 130 can take 15 ms with a conventional nematic material, or less than 1ms with a dual frequency nematic material. Other electro-optic techniques for varying the retardation of the switchable waveplates, e.g., Pockels cell, may be employed without departing from the scope hereof.

In an embodiment, voltage V1 is also changed to correspondingly alter the retardation for waveplates 132, 134, 136, 138, so that rotator 130 is operable across another wavelength range. In this embodiment, therefore, rotator 130 is "tunable" to a desired wavelength range.

Polarization rotators such as described herein may be beneficially used in spectroscopic polarimetry, to obtain spectral for two separate polarization states; broad band beam steering, to steer an optical beam in one direction due to the first polarization state and then in another direction due to the second polarization state; and fiber optical switching, for example to switch quickly between different fiber based communication channels.

In the case of rotator 130, it is further appreciated that absorption losses of liquid crystal material and the associated transparent conductor (used to activate the liquid crystal material) is particularly low, e.g., less than about one percent. Moreover, a stack of the liquid crystal waveplates may be thin, in the millimeter range (e.g., less than 10 millimeters). Accordingly, rotator 130 may be beneficially used in applications requiring high transmittance and within devices having small dimensions.

In FIG. 6, incident electromagnetic energy 140 is shown at an angle of incidence 4) relative to optical axis 171 of rotator 130. Typically, 4) is zero; however it may be beneficially another angle depending upon application, such as in imaging. An angle change of 4) is equivalent to a change in wavelength k; thus, over a spectral range, rotator 130 maintains its polarization efficiency at an incident angle up to, approximately, +/−60 degrees (angle 4)). Similarly temperature change will introduce shift of the working wavelength range. Due to the broad band nature of the device, rotator 130 may thus provide tolerance of temperature dependence of electrooptic effects.

Voltages applied to rotator 130 may also be chosen to compensate for environmental changes such as temperature. A temperature sensor 173 may be included to measure actual temperature. Retardation of liquid crystal material of waveplates 132, 134, 136, 138 varies with temperature, so by adjusting V1, temperature changes may be mitigated to maintain performance of rotator 130. Electronics 142 may automatically adjust V1 based upon temperature of sensor 173, for example, so that rotator automatically compensates for temperature variation.

FIG. 7 shows one apochromatic polarization rotator 230; rotator 230 may again be configured to operate across a broad spectral range such as described in FIG. 2. Rotator 230 has a first fixed waveplate 232, a second fixed waveplate 234, first switchable waveplate 236 and a second switchable waveplate 238. Each waveplate 232, 234, 236, 238 is for example a half-wave plate with a retardation of approximately 180 degrees for a specific wavelength a; however waveplates 236, 238 are configured to rotate (thus being "switchable" due to rotation) when driven by a motor 250. In particular, by applying control signals 252 to motor 250 (e.g., via electronics 242 under control of software 246), motor 250 rotates waveplates 236, 238, to rotate orientation of their respective principal axes. Motor 250 may in particular rotate each waveplate 236, 238 separately—such as through operation of a clutch engagement mechanism 254 (or other similarly functioning device, even a separate motor)—so that rotation of waveplates 236, 238 may occur in accordance with Table 2, for example (i.e., where the principal axes are not coaligned). Control signals 252 may thus correspond to applied voltages that induce mechanical toque or force onto waveplates 236, 238 via motor 250.

Changes may be made to this application without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A tunable polarization rotator, comprising:
    four switchable waveplates configured such that broad spectral electromagnetic radiation transmitted through all of the waveplates has a first rotated polarization, the switchable waveplates changing retardation in response to one or more control signals such that the electromagnetic radiation transmitted through all of the waveplates has a second rotated polarization, the control signals compensating for temperature of the waveplates.

2. The polarization rotator of claim 1, the rotator having polarization rotator efficiency greater than 0.95 within a spectral band about wavelength λ.

3. The polarization rotator of claim 1, wherein the waveplates have a combined thickness along an optical axis of less than about ten millimeters.

4. The polarization rotator of claim 1, the switchable waveplates comprising nematic liquid crystal material.

5. The polarization rotator of claim 1, further comprising a temperature sensor for determining the temperature, and electronics for automatically varying voltage in compensation to the temperature.

6. The polarization rotator of claim 1, wherein the control signals are changed to alter retardation of the switchable waveplates so that the rotator is operable across another wavelength range.

7. The polarization rotator of claim 6, further comprising adjusting voltage applied to the switchable waveplates to compensate for temperature change of the waveplates.

8. The polarization rotator of claim 1, wherein incident electromagnetic energy to the polarization rotator is up to about 60 degrees from normal incidence.

9. The polarization rotator of claim 8, wherein the incident electromagnetic energy is uncollimated or divergent.

10. The polarization rotator of claim 1, further comprising a polarizer such that the polarization rotator functions as a broad band switchable polarization filter.

11. The polarization rotator of claim 1, further comprising a non-absorbing polarizer such that the polarization rotator functions as a broad band beam steering device.

12. The polarization rotator of claim 1, the waveplates being configured to rotate polarization other than 90 degrees.

13. A tunable polarization rotator, comprising:
    four switchable waveplates configured such that broad spectral electromagnetic radiation transmitted through all of the waveplates has a first rotated polarization, the switchable waveplates changing retardation in response to one or more control signals such that the electromagnetic radiation transmitted through all of the waveplates has a second rotated polarization, the principal axes of the four switchable waveplate being approximately 7.5 degrees, 29.5 degrees, 60.5 degrees, 82.5 degrees respectively.

14. The rotator of claim 13, wherein the principal axes are approximately +/− six degrees.

* * * * *